UNITED STATES PATENT OFFICE.

JAMES B. FORSYTH, OF BOSTON, MASSACHUSETTS, ASSIGNOR TO HIMSELF AND JOHN H. CHEEVER, OF NEW YORK.

IMPROVEMENT IN LINING FLEXIBLE AND OTHER HOSE AND TUBES WITH INDIA-RUBBER, &c.

Specification forming part of Letters Patent No. 79,220, dated June 23, 1868.

*To all whom it may concern:*

Be it known that I, JAMES B. FORSYTH, of Boston, in the county of Suffolk and State of Massachusetts, have invented certain new and useful Improvements in Lining Flexible and other Tubes, Hose, &c., with India-Rubber or equivalent material; and I hereby declare the following to be a full, clear, and exact description of the same.

My invention has relation to the method of lining tubes, hose, and other cylindrical or tubular articles, whether flexible or not, with india-rubber or equivalent material. Many methods of lining such objects with india-rubber have been essayed, but with little success, and it is only with considerable labor and expense, and with no certainty of obtaining a perfect article, that a tube can be thus lined by any mode now in use.

The object of my invention is to obviate these difficulties, and to produce a cheap, quick, and simple process of lining such articles; and to this end it may be stated, in general terms, to consist in applying to the hose or other object to be lined a lining of vulcanized rubber or other suitable material, with a coating or layer of unvulcanizable gum interposed between the two; and, further, in the use of steam, hot air, or hot water, introduced within the tubular lining, for the purpose of softening the interposed layer of unvulcanizable material, and of forcing or pressing the same into the meshes, pores, or openings of the article to be lined.

In illustration of the manner in which my invention is or may be carried into effect, I will now proceed to describe the method employed by me of lining seamless or woven hose, it being understood that substantially the same method may be pursued in lining any other cylindrical or tubular article.

I first take the piece of woven hose to be lined and have it properly dried, so that there will be no moisture in the same to prevent the inside lining from adhering. I then make a sheet of any suitable rubber compound—for instance, that used for the inside of the ordinary rubber hose—and on one side of this sheet is run a coat of pure gum, free from sulphur; or a cheap compound may be used by compounding the rubber with white lead, whiting, or white oxide of zinc, but, as before, with no admixture of sulphur.

The thickness of the coat of unvulcanizable material may be varied, according to the quality of the goods to be lined. If the goods be very rough, a heavier coat will be necessary than if the material were comparatively smooth and even. The sheet thus prepared is cut into strips of the required length and width to form the tube desired. The coat of pure or unvulcanizable gum must be on the outside of the tube, and care should be taken to make good seams or joints in the tube, and also to have them well stuck down, all of which is well understood by india-rubber manufacturers. After the rubber tube is made, it is laid in a carriage and run into a heater or vulcanizer and cured, which operation will take from one and a half to two hours at 250° Fahrenheit for the ordinary hose-lining compound. After the tube has been removed from the heater, the inside part of it will be vulcanized, while its outside coat is unvulcanized.

The tube is now ready to be inserted into the seamless hose, which may be accomplished in the following manner:

The tube is first doubled, so as to reduce its width about one-half, and to one of its ends is fastened a string, which is passed through the hose by means of a rod or wire. The tube can then be drawn through the seamless or woven hose without difficulty. A small quantity of soapstone-dust may be rubbed over the outside of the tube, to facilitate the passage of the same into the hose; or the tube may be drawn into the hose by any other suitable means. After the tube is in the hose, a coupling is inserted in each end of the same, and securely fastened thereto. One end of the hose is then screwed to a steam-pipe, and the other end to a blow-off pipe provided with a small valve or drip-cock. All connections being made, steam is let on slowly, to allow the tube to become warm and to expand into place, which will probably take about five minutes, and the steam may then be let on until it reaches a pressure of from fifty to sixty pounds to the square inch, according to the size and strength of the object to be lined, and whether it is rough or smooth inside. During the time the steam is turned on, the valve or drip-cock in the blow-off pipe must be almost shut, or opened just far enough to allow the condensed steam to pass off from the article which is being lined. Fifteen minutes at the above-named pressure is sufficient for almost any article.

After the steam is shut off the hose must be allowed to remain expanded until it cools. The valve or drip-cock is always shut during the cooling process, for the purpose of keeping the article expanded, if it is flexible. Cold water may be forced into the lined article immediately after the steam is shut off, thereby both cooling the lining and keeping the article expanded. After the lining is cold the hose is fit for use.

Tubes and other articles, when properly lined according to this process, will be perfectly tight, and cloth or woven articles will last longer with my improved lining (a part of which is vulcanized and a part unvulcanized) than with a lining wholly vulcanized, on account of there being no sulphur in the rubber that comes in contact with the cloth or woven material. The heat of the steam softens the unvulcanizable coating of gum on the outside of the lining, while the pressure of the steam forces the soft unvulcanizable material into the pores, openings, or meshes of the article so lined.

Plies of cloth or other suitable material may be added or inserted into the tube or lining by either coating the gum on the same in the first place, and then making a tube or lining of rubber and cloth, or by making a rubber tube or lining, and afterward wrapping the cloth or duck around the tube or lining, care being taken to have the outside of the tube or lining coated or saturated with a suitable material, (pure rubber or its equivalent,) so that the tube or lining will stick or adhere to the hose or article to be lined.

By this method no outside wrappings are required, as is the case when making ordinary rubber hose. The hose or other article will also look nice and clean when finished, on account of there being but little handling during the whole operation of lining, and the whole operation can be carried on by a few hands and at little expense.

If desirable, the woven or seamless hose may be coated on the outside with india-rubber previous to having the tube or lining inserted. In such case the hose can be submitted to the vulcanizing process previous to the insertion of its lining, or afterward—that is to say, the coating on the outside of the hose can be vulcanized either before or after the tube or lining is inserted in its place—by laying the hose in a carriage and allowing the steam to pass both through and around it.

Having now described my invention, and the manner in which the same is or may be carried into effect, what I claim, and desire to secure by Letters Patent, is—

1. Water-proof hose or tubing composed of a tube of woven fabric or other material and a vulcanized india-rubber lining, the two being held and cemented together by interposed non-vulcanizable gum, as and for the purposes herein set forth.

2. The method of lining hose or other tubular articles by inserting in the article to be lined the vulcanized rubber or equivalent lining, with its coating or exterior layer of unvulcanizable gum, and then expanding said lining and forcing the said gum or cementing material into the meshes or pores of the article to be lined by means of steam, hot water, or hot air introduced within the lining, as set forth.

3. A lining for hose and other tubular articles, composed of a tube of vulcanized rubber, with an exterior coating or layer of unvulcanizable gum or cement, with or without one or more plies of cloth or other fabric combined and united with the lining, as herein set forth.

4. The method herein described of coating the hose or tubing with vulcanized rubber, both internally and externally, as and for the purposes set forth.

In testimony whereof I have signed my name to this specification before two subscribing witnesses.

JAMES B. FORSYTH.

Witnesses:
   J. B. INGALLS,
   J. B. SIMPSON.